(12) United States Patent
Oota et al.

(10) Patent No.: US 10,720,762 B2
(45) Date of Patent: Jul. 21, 2020

(54) MECHANISM AND METHOD FOR MAKING CONNECTION BETWEEN ELECTRONIC DEVICES

(71) Applicant: Yokogawa Electric Corporation, Musashino-shi, Tokyo (JP)

(72) Inventors: Yasunori Oota, Musashino (JP); Takuya Nidaira, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 645 days.

(21) Appl. No.: 15/030,971

(22) PCT Filed: Sep. 25, 2014

(86) PCT No.: PCT/JP2014/075350
§ 371 (c)(1),
(2) Date: Apr. 21, 2016

(87) PCT Pub. No.: WO2015/060055
PCT Pub. Date: Apr. 30, 2015

(65) Prior Publication Data
US 2016/0261100 A1    Sep. 8, 2016

(30) Foreign Application Priority Data
Oct. 24, 2013 (JP) ................................. 2013-221024

(51) Int. Cl.
*F16L 23/04* (2006.01)
*H02G 3/06* (2006.01)
(52) U.S. Cl.
CPC .............. *H02G 3/06* (2013.01); *F16L 23/04* (2013.01)

(58) Field of Classification Search
CPC .................................. H02G 3/06; F16L 23/04
(Continued)

(56) References Cited

U.S. PATENT DOCUMENTS 2,689,141 A * 9/1954 Kiekhaefer ............ F16L 23/06
24/279
3,042,430 A * 7/1962 Guy ........................ F16L 23/06
24/270
(Continued)

FOREIGN PATENT DOCUMENTS

GB          2446813 A      8/2008
JP        S 56-133922 A    10/1981
(Continued)

OTHER PUBLICATIONS

Communication dated Feb. 28, 2017, from the European Patent Office in counterpart European Application No. 14854982.7.
(Continued)

*Primary Examiner* — Anna M Momper
*Assistant Examiner* — Fannie C Kee
(74) *Attorney, Agent, or Firm* — Sughrue Mion, LLC

(57) ABSTRACT

A connection mechanism for connecting electronic devices to each other, includes piping connectors, on which flange portions and guide hole portions are formed, and a piping clamp, which has arm portions having a groove formed to allow the flange portions to be fitted therein and a mechanism for fastening and fixing the arm portions to each other. The connection mechanism enhances workability when an electronic device, which requires an angular adjustment about on an axis of a connection portion thereof, is fixedly connected to another electronic device.

10 Claims, 7 Drawing Sheets

(58) Field of Classification Search
USPC ......... 285/252–253, 363–365, 405–407, 420
See application file for complete search history.

(56) References Cited

U.S. PATENT DOCUMENTS

| | | | | |
|---|---|---|---|---|
| 3,744,825 | A * | 7/1973 | Cooper | F16L 23/04 24/279 |
| 4,660,869 | A * | 4/1987 | Gabus | F16L 23/18 285/331 |
| 5,967,564 | A * | 10/1999 | Gaucherot | F16L 23/04 24/279 |
| 6,354,636 | B2 * | 3/2002 | Matsuzawa | F16L 23/08 285/334.5 |
| 6,439,619 | B1 * | 8/2002 | Storage | F16L 23/04 285/330 |
| 2003/0122377 | A1 * | 7/2003 | Northrop | F16L 23/08 285/363 |
| 2007/0246258 | A1 | 10/2007 | Magno | |
| 2008/0197627 | A1 * | 8/2008 | Baudoin | F16L 23/08 285/330 |
| 2010/0289256 | A1 | 11/2010 | Shumard | |
| 2011/0042947 | A1 | 2/2011 | Hansen | |
| 2012/0227221 | A1 | 9/2012 | Whitaker et al. | |
| 2012/0326440 | A1 * | 12/2012 | Weinhold | F16L 3/1222 285/374 |

FOREIGN PATENT DOCUMENTS

| | | |
|---|---|---|
| JP | H 9-257167 A | 9/1997 |
| JP | 2002340260 A | 11/2002 |
| JP | 2003247681 A | 9/2003 |
| JP | 2004520789 A | 7/2004 |
| JP | 2005195164 A | 7/2005 |
| JP | 2005292026 A | 10/2005 |
| JP | 2009-162252 A | 7/2009 |
| WO | 02/16808 A2 | 2/2002 |
| WO | 2009/146764 A1 | 12/2009 |

OTHER PUBLICATIONS

Search Report (PCT/ISA/210) dated Dec. 16, 2014, issued by the International Searching Authority in counterpart International Application No. PCT/JP2014/075350.
Written Opinion (PCT/ISA/237) dated Dec. 16, 2014, issued by the International Searching Authority in counterpart International Application No. PCT/JP2014/075350.
Communication dated Oct. 27, 2017, issued by the European Patent Office in counterpart European Patent Application No. 14854982.7.

* cited by examiner

US 10,720,762 B2

MECHANISM AND METHOD FOR MAKING CONNECTION BETWEEN ELECTRONIC DEVICES

TECHNICAL FIELD

The present invention relates to a mechanism and a method for connecting electronic devices to each other, and in particular to such a connection mechanism and a connection method, which can enhance workability when connecting an electronic device requiring an angular adjustment about an axis of a connection portion thereof.

BACKGROUND ART

When two electronic devices are fixedly connected to each other, a method of using a dedicated connection mechanism is known. FIG. 8 is a view explaining a conventional example of a connection mechanism for fixedly connecting electronic devices to each other. In the example of FIG. 8, a connection mechanism 530 for fixedly connecting a first electronic device 510 and a second electronic device 520 to each other is shown. In addition to fixedly connecting the first electronic device 510 and the second electronic device 520 to each other, the connection mechanism 530 also has a function of protecting the interiors of electronic devices by preventing water from penetrating through a connection portion thereof. Meanwhile, the first electronic device 510 and the second electronic device 520 are shown in a state where lids of housings thereof are removed.

The first electronic device 510 has a terminal block 511 therein and the second electronic device 520 has a terminal block 521 therein, and the first electronic device 510 and the second electronic device 520 are electrically connected to each other by a wiring 540. The connection mechanism 530 is provided with a wiring hole allowing the wiring 540 to pass therethrough.

The connection mechanism 530 includes a first piping connector 531 configured to be connected to the first electronic device 510, a second piping connector 532 configured to be connected to the second electronic device 520, and a nut 533 for connecting the first piping connector 531 with the second piping connector 532.

FIG. 9A and 9B are views showing a structure of the conventional connection mechanism 530, in which FIG. 9A is a perspective view thereof and FIG. 9B is an exploded perspective view. The nut 533 is configured so that a female threaded portion 533a is formed up to the middle of a through-hole thereof and the opposite side is formed to have a diameter smaller than that of the female threaded portion. The smaller diameter portion servers as a slide hole 533b.

The first piping connector 531 has a wiring hole provided therethrough and is provided with a male threaded portion 531a configured to be fastened to a female threaded portion formed in the first electronic device 510, a hexagonal fastening portion 531b allowing fastening to be performed with a tool when being fastened to the first electronic device 510, and a male threaded portion 531c configured to be fastened to the female threaded portion 533a of the nut 533.

The second piping connector 532 has a wiring hole provided therethrough and is provided with a male threaded portion 532a configured to be fastened to a female threaded portion formed in the second electronic device 520, a hexagonal fastening portion 532b allowing fastening to be performed with a tool when being fastened to the second electronic device 550, a guide portion 532c configured to be guided by the slide hole 533b of the nut 533 in an axial direction thereof, and a flange portion 532d having a diameter larger than that of the slide hole 533b and serving as a stopper for preventing the nut 533 from failing off. The diameter of the flange portion 532d is formed to be smaller than the diameter of the female threaded portion 533a of the nut 533, and thus by tightening the nut 533, the flange portion 532d is urged in a direction of the first piping connector 531, so that the second electronic device 520 can be fixed at a certain angle about an axis.

FIG. 10 is a view explaining procedures when the connection mechanism 530 fixedly connects the first electronic device 510 and the second electronic device 520 to each other. In this case, it is assumed that the second electronic device 520 is connected to the first electronic device 510 which has already been installed. Also, it is assumed that the second electronic device 520 requires an angular adjustment about the axis during connection. For example, this corresponds to a case where the second electronic device 520 has a communication antenna and is fixed in an orientation providing a good communication state, or a case where an exactly horizontal or vertical state thereof is required due to the interior structure thereof, and the like.

First, the first piping connector 531 is fastened to the first electronic device 510, and the second piping connector 532 passes through the nut 533 and then is fastened to the second electronic device 520. At this time, a tool, such as a wrench, suitable to a size of the hexagonal fastening portion 531b of the first piping connector 531 and the hexagonal fastening portion 532b of the second piping connector 532 is used.

The second electronic device 520 is moved close to the first electronic device 510 and then the second electronic device 520 is positioned at an angle about the axis. Also, while the angle is kept, the female threaded portion 533a of the nut 533 is fastened to the male threaded portion 531c of the first piping connector 531. At this time, a tool, such as a wrench, suitable to a size of the nut 533 is used. Thus, the first electronic device 510 and the second electronic device 520 are fixedly connected to each other by the connection mechanism 530.

FIG. 11 is a sectional view showing the first piping connector 531 and the second piping connector 532 fixedly connected by the connection mechanism 530. Herein, O-rings are used to keep waterproof property of connection portions. Specifically, an O-ring 534a is used to ensure waterproof property between the first electronic device 510 and the first piping connector 531, and an O-ring 534b is used to ensure waterproof property between the second electronic device 520 and the second piping connector 532. Also, an O-ring 534c is used to ensure waterproof property between the first piping connector 531 and the second piping connector 532.

CITATION LIST

Patent Document

Patent Document 1: Japanese Patent Application Publication No. 2005-292026

SUMMARY OF INVENTION

Technical Problem

In the case where the second electronic device 520 requires an angular adjustment about the axis, an operation of fastening the nut 533 has to be performed after the second electronic device 520 is positioned. At this time, the second electronic device 520 has to be held so that the angle at which the second electronic device 520 is positioned can be kept. Therefore, workability is poor.

Also, there is a case where a force is exerted on the second electronic device 520 in a rotation direction about the axis due to fastening of the nut 533 so that the adjusted angle is changed and thus readjustment thereof is required, or a case where fastening or loosening of the nut 533 influences a fastening state of the first piping connector 531 or second piping connector 532, which is coaxially rotated therewith, to the electronic devices. Likewise, this is the cause that workability is deteriorated.

Further, the second piping connector 532 has to pass through the nut 553 and thus the nut 533 has to have an outer diameter larger than an outer diameter of the second piping connector 532. Accordingly, for the connection operation, two types of tools, i.e., a tool suitable to a size of the hexagonal fastening portion 531b of the first piping connector 531 and the hexagonal fastening portion 532b of the second piping connector 532 and a tool suitable to a size of the nut 533 have to be prepared.

An installation site of the first electronic device 510 and the second electronic device 520 is likely to be located at a high place, a narrow place and the like, and thus is not always located at a place where the operation can be easily performed. Thus, an enhanced workability is strongly desired.

Accordingly, an object of the present invention is to enhance workability when an electronic device, which requires an angular adjustment about an axis of a connection portion thereof, is fixedly connected to another electronic device.

Solution to Problem

In order to solve the above object, a first aspect of the present invention provides a connection mechanism which connects a first electronic device and a second electronic device to each other, including a first cylindrical piping connector comprising a first flange portion and a guide portion having a shape protruding in an axial direction, the first piping connector configured to be connected to the first electronic device; a second cylindrical piping connector comprising a second flange portion having the same diameter as that of the first flange portion and a guide hole portion having a shape recessed in the axial direction to allow the guide portion to be fitted therein, the second piping connector configured to be connected to the second electronic device; and a piping clamp including two half circular arc-shaped arm portions and a fastening and fixing mechanism configured to fasten and fix the two arm portions to form a circle, the two arm portions having a groove formed in an inner circumference thereof to allow the first flange portion and the second flange portion to be fitted therein in a state where the guide portion is fitted in the guide hole portion.

In this case, each of the first flange portion and the second flange portion may have cut-out surfaces formed in parallel to each other at two symmetrical positions on an outer circumference thereof, and the cut-out surfaces of the first flange portion and the second flange portion may have the same shape.

Also, a part of the first flange portion, which is located toward the first electronic device, and a part of the second flange portion, which is located toward the second electronic device, may be tapered, and the groove of the arm portions of the piping clamp may have inclined surfaces formed to be widened toward the inner circumference.

Further, the two arm portions of the piping clamp may be connected at one ends thereof to each other via a pin to allow the arm portions to be opened and closed and a hook and a butterfly nut are used as the fastening and fixing mechanism at the other ends of the two arm portions.

Further, one of the first piping connector and the second piping connector may have an inner diameter-changing part, and an inclined surface may be formed on the inner diameter-changing part.

In order to solve the above object, a second aspect of the present invention provides a method for connecting a first electronic device and a second electronic device to each other, including fastening a first cylindrical piping connector to the first electronic device, the first piping connector comprising a threaded portion, a first flange portion and a guide portion having a shape protruding in an axial direction; fastening a second cylindrical piping connector to the second electronic device, the second piping connector provided with a threaded portion, a second flange portion having the same diameter as that of the first flange portion and a guide hole portion having a shape recessed in the axial direction to allow the guide portion to be fitted therein; fitting the guide portion of the first piping connector into the guide hole portion of the second piping connector; and fastening and fixing two half circular-arc shaped arm portions of a piping clamp to from a circle, the two arm portions having a groove formed in an inner circumference thereof, after the first flange portion and the second flange portion are fitted in the groove in an overlapped state.

Advantageous Effects of Invention

According to the present invention, workability when an electronic device, which requires an angular adjustment about an axis of a connection portion thereof, is fixedly connected to another electronic device can be enhanced.

DESCRIPTION OF EMBODIMENTS

Figure 1:
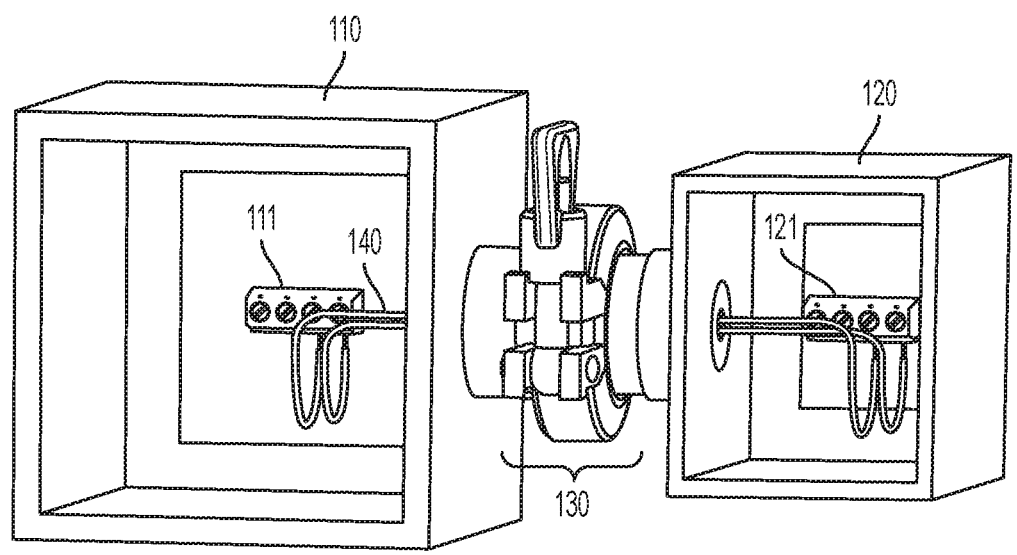
FIG. 1 is a view explaining a connection mechanism for fixedly connecting electronic devices to each other according the present embodiment.

Embodiments of the present invention will be described with reference to the accompanying drawings. FIG. 1 is a view explaining a connection mechanism for fixedly connecting electronic devices to each other according the present embodiment. In an example of this figure, a connection mechanism 130 for fixedly connecting a first electronic device 110 and a second electronic device 120 to each other is shown. In addition to fixedly connecting the first electronic device 110 and the second electronic device 120 to each other, the connection mechanism 130 also has a function of protecting the interiors of electronic devices by preventing water from penetrating through a connection portion of the first electronic device 110 and the second electronic device 120. However, such a waterproof function may be omitted. Meanwhile, the first electronic device 110 and the second electronic device 120 are shown in a state where lids of housings thereof are removed.

The first electronic device 110 has a terminal block 111 therein and the second electronic device 120 has a terminal block 121 therein, and the first electronic device 110 and the second electronic device 120 are electrically connected to each other by a wiring 140. The connection mechanism 130 is provided with a wiring hole allowing the wiring 140 to pass therethrough.

Figure 2:
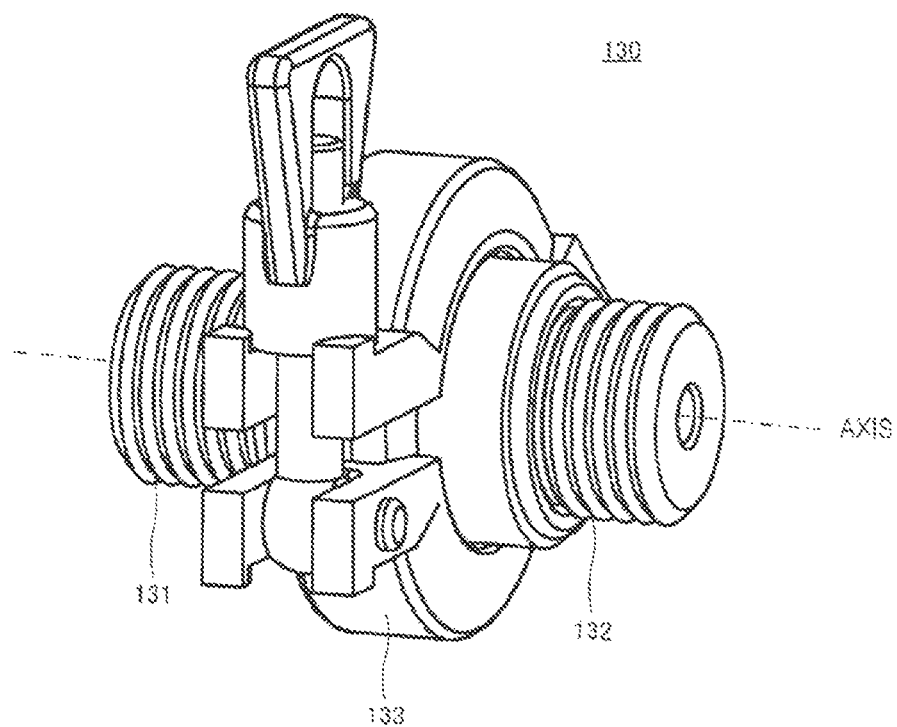
FIG. 2 is a view showing the exterior of the connection mechanism according to the present embodiment.

FIG. 2 is a view showing the exterior of the connection mechanism 130 according to the present embodiment. As shown in this figure, the connection mechanism 130 includes a first cylindrical piping connector 131 configured to be connected to the first electronic device 110, a second cylindrical piping connector 132 configured to be connected to the second electronic device 120, and a piping clamp 133 for connecting the first piping connector 131 with the second piping connector 132. A center line extending through the first cylindrical piping connector 131 and the second electronic device 120 in a connection direction corresponds to an axis.

Figure 3A:
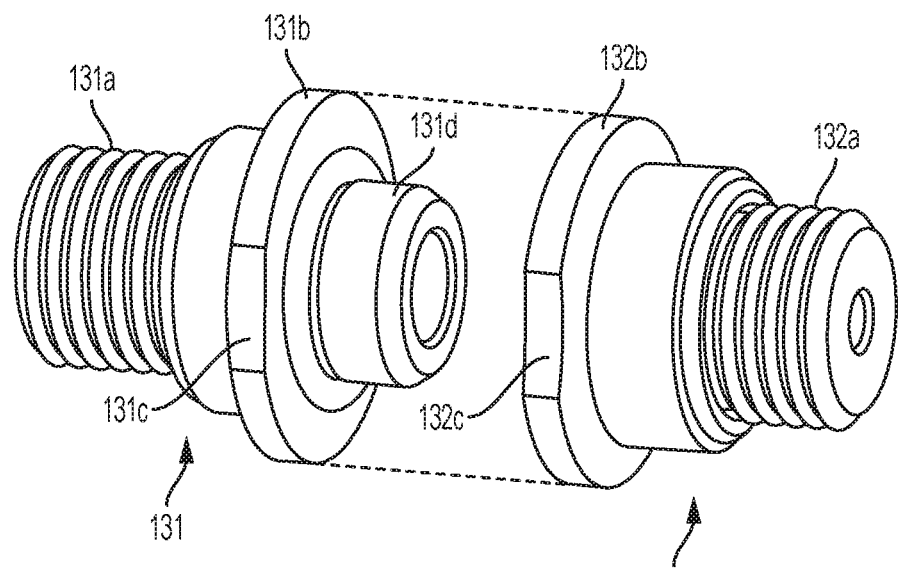
FIGS. 3A and 3B are views showing structures of a first piping connector and a second piping connector according to the present embodiment.
Figure 3B:
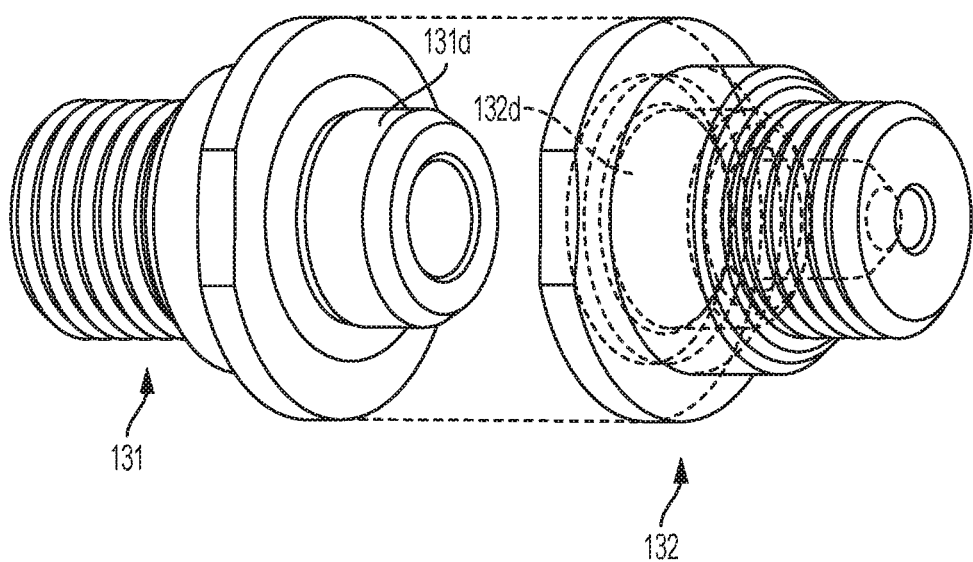

FIGS. 3A and 3B are views showing structures of a first piping connector and a second piping connector according to the present embodiment, in which FIG. 3A is a perspective view thereof and FIG. 3B is a view showing the second piping connector 132 by a transparent view.

The first piping connector 131 has a wiring hole provided therethrough and is provided with a male threaded portion 131a configured to be fastened to a female threaded portion formed in the first electronic device 110, a flange portion 131b and a guide portion 131d. The guide portion 131d is formed in a shape protruding in an axial direction away from the male threaded portion 131a. The flange portion 131b has cut-out surfaces 131c formed in parallel to each other at two symmetrical positions on an outer circumference thereof for stably holding a tool when being fastened to the first electronic device 110. Also, a surface of the flange portion 131b, which is located on a side thereof to be connected to the first electronic device 110, is of a tapered shape.

The second piping connector 132 has a wiring hole provided therethrough and is provided with a male threaded portion 132a configured to be fastened to a female threaded portion formed in the second electronic device 120, a flange portion 132b and a guide hole portion 132d. The guide hole portion 132d is formed in a shape recessed in an axial direction away from the male threaded portion 132a. The flange portion 132b has cut-out surfaces 132c formed in parallel to each other at two symmetrical positions on an outer circumference thereof for stably holding a tool when being fastened to the second electronic device 120. Also, a surface of the flange portion 132b, which is located on a side thereof to be connected to the second electronic device 120, is of a tapered shape.

The flange portion 132b and cut-out surfaces 132c of the second piping connector 132 have the same shapes and sizes as those of the flange portion 131b and cut-out surfaces 131c of the first piping connector 131. Therefore, an operation of fastening the first piping connector 131 to the first electronic device 110 and an operation of fastening the second piping connector 132 to the second electronic device 120 can be performed using the same tool. Meanwhile, the shapes and numbers of the cut-out surfaces 131c and 132c may be set to be suitable to a tool to be used.

The guide hole portion 132d formed in the second piping connector 132 has a shape and size allowing the guide portion 131d of the first piping connector 131 to be fitted therein. In a state where the guide portion 131d is fitted in the guide hole portion 132d, the flange portion 131b of the first piping connector 131 and the flange portion 132b of the second piping connector 132 are overlapped with each other to be relatively rotatable about the axis. Alternatively, the guide hole portion may be formed in the first piping connector 131 and the guide portion may be formed on the second piping connector 132.

Figure 4A:
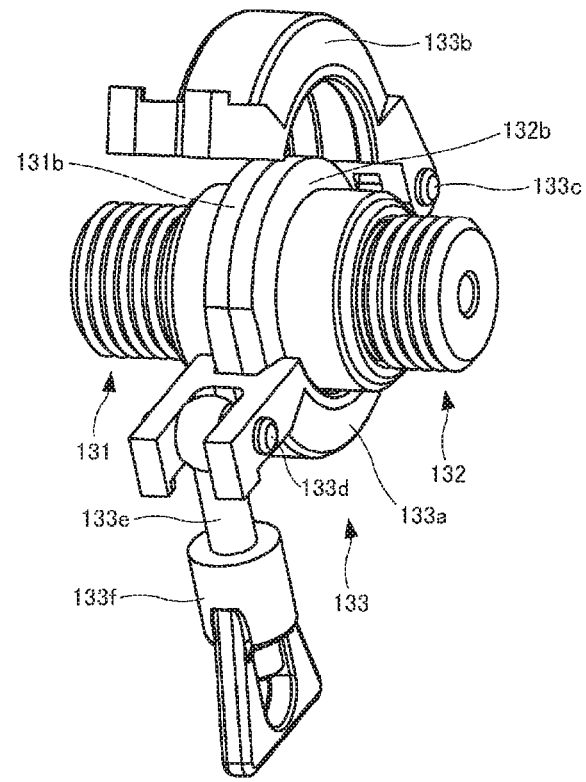
FIGS. 4A and 4B are views showing a structure of a piping clamp.
Figure 4B:
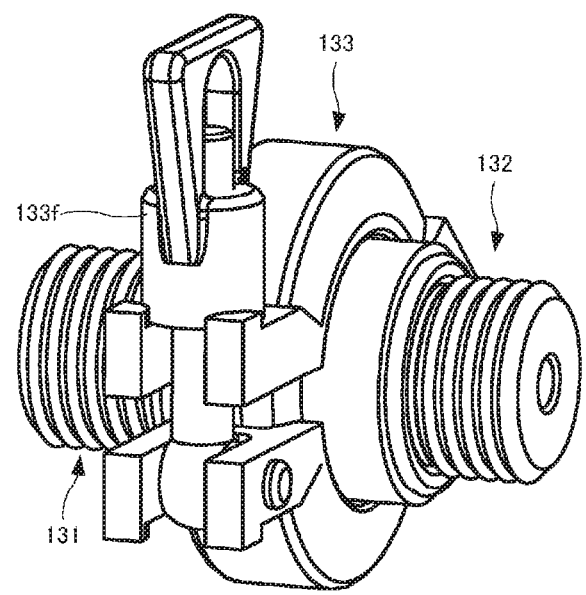

FIGS. 4A and 4B are views showing a structure of the piping clamp 133. As shown in FIG. 4A, in the piping clamp 133, one end of a first half circular-arc shaped arm 133a and one end of a second half circular arc-shaped arm 133b are attached to each other by a pin 133c to allow the first arm 133a and the second arm 133b to be opened and closed. The other end of the first arm 133a and the other end of the second arm 133b are provided with a fastening and fixing mechanism for fastening and fixing the other ends to each other in a state where the first arm 133a and the second arm 133b are closed.

In this case, a bolt 133e is attached to the end of the first arm 133a via a pin 133d to be rotatable in an opening and closing direction of the arms and a butterfly nut 133f is screwed on a side of the bolt 133e opposite to the pin 133d. Also, the end of the second arm 133b is of a hook shape allowing the butterfly nut 133f to be caught thereon.

Accordingly, as shown in FIG. 4B, in the state where the first arm 133a and the second arm 133b are closed to form a circle, the bolt 133e with the butterfly nut 133f screwed thereon are rotated toward the second arm 133b so that the butterfly nut 133f is caught on the hook, and then the butterfly nut 133f is tightened so that the first arm 133a and the second arm 133b are fixed to each other. When the butterfly nut 133f is tightened, no tool is required. Alternatively, the fastening and fixing mechanism of the piping clamp 133 may have any other structures.

An inner side of the first arm 133a and an inner side of the second arm 133b have a shape of a groove extending along an inner circumference thereof and defined by a bottom surface and right and left inclined surfaces. When the arms are closed, the inclined surfaces of the groove, which have a shape widened toward the inner circumference, sandwich and secure the tapered part of the flange portion 131b of the first piping connector 131 and the tapered part of the flange portion 132b of the second piping connector 132 overlapped with each other.

Figure 5:
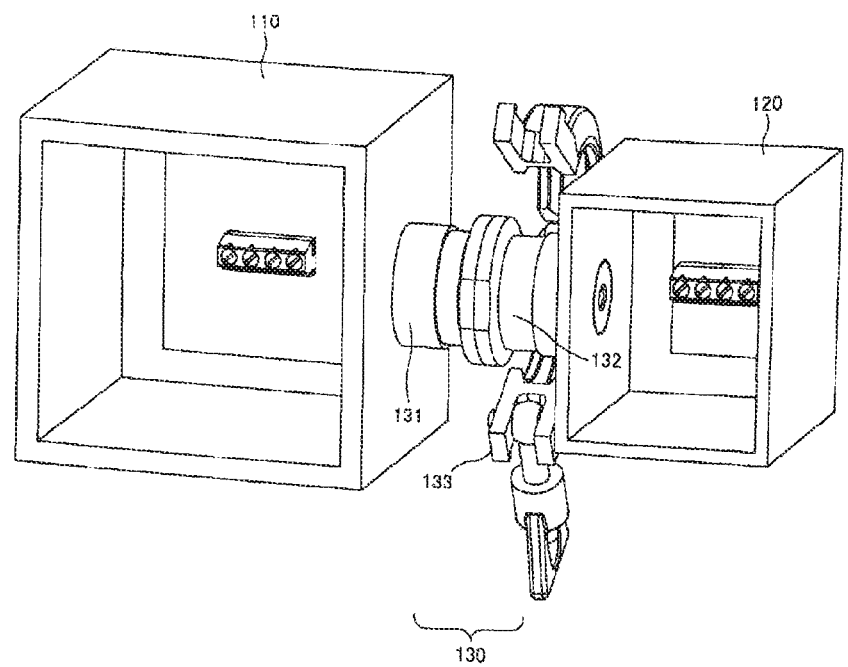
FIG. 5 is a view explaining procedures when the connection mechanism fixedly connects a first electronic device and a second electronic device to each other.

FIG. 5 is a view explaining procedures when the connection mechanism 130 fixedly connects the first electronic device 110 and the second electronic device 120 to each other. Herein, it is assumed that the second electronic device 120 is connected to the first electronic device 110 which has already been installed. Also, it is assumed that the second electronic device 120 requires an angular adjustment about the axis during connection. For example, this corresponds to a case where the second electronic device 120 has a communication antenna and is fixed in an orientation providing a good communication state, or a case where an exactly horizontal or vertical state thereof is required due to the interior structure thereof, and the like.

First, the first piping connector 131 is fastened to the first electronic device 110 and the second piping connector 132 is fastened to the second electronic device 120. At this time, a tool, such as a wrench, can come in contact with the cut-out surfaces 131c of the flange portion 131b of the first piping connector 131 to fasten the first piping connector 131 to the first electronic device 110, and the same tool can come in contact with the cut-out surfaces 132c of the flange portion 132b of the second piping connector 132 to fasten the second piping connector 132 to the second electronic device 120.

Subsequently, the second electronic device 120 is moved close to the first electronic device 110 and then the guide portion 131d of the first piping connector 131 is fitted into the guide hole portion 132d of the second piping connector 132. In this state, which is a temporary arrangement state, the second electronic device 120 is stably maintained relative to the first electronic device 110 so that positioning of the second electronic device 120 at an angle about the axis can be facilitated.

Once an angle of the second electronic device 120 is determined, the arms 133a and 133b of the piping clamp 133 are opened, the piping clamp 133 is attached so that the groove in the inner circumference of the arms sandwiches the flange portion 131b of the first piping connector 131 and the flange portion 132b of the second piping connector 132 overlapped with each other, and then the arms 133a and 133b of the piping clamp 133 are closed. In this state, the butterfly nut 133f is caught on the hook and then the butterfly nut 133f is tightened, so that the first piping connector 131 and the second piping connector 132 are fixedly connected to each other.

At this time, because no force is exerted on the second electronic device 120 in a rotation direction about the axis, the adjusted angle is kept. Also, because no force is exerted on the first piping connector 132 or second piping connector 132 in the rotation direction about the axis, there is no influence on a fastening state of the first piping connector 131 or second piping connector 132 to the electronic devices.

In addition, because no tool is required for tightening the butterfly nut 133f, only one type of a tool required when the first piping connector 131 is fastened to the first electronic device 110 and the second piping connector 132 is fastened to the second electronic device 120 is enough.

Therefore, according to the connection mechanism 130 of the present embodiment, workability when the first electronic device 110 and the second electronic device 120 are connected to each other can be enhanced and thus the connection operation can easily performed even at high places, narrow places and the like.

Figure 6:
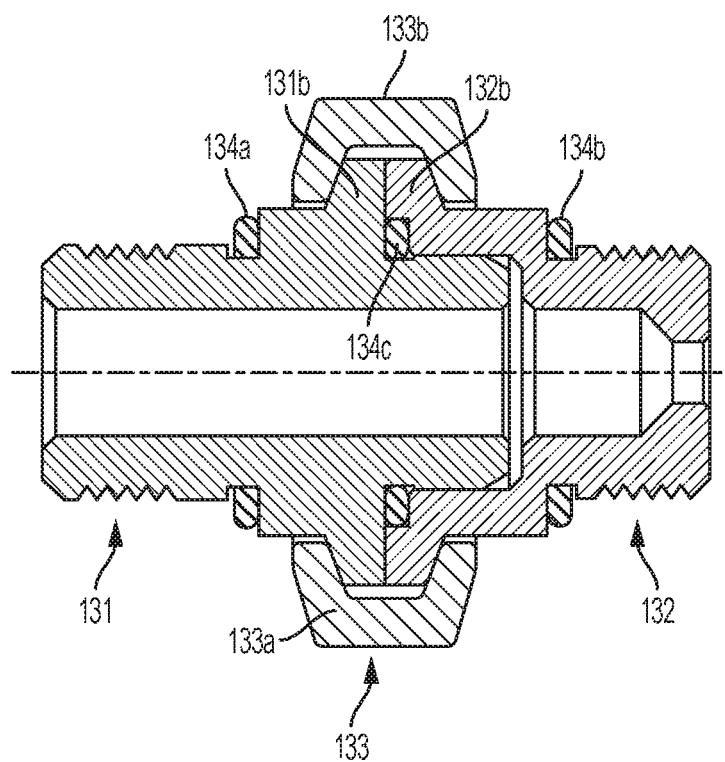
FIG. 6 is a sectional view showing the first piping connector and the second piping connector fixedly connected by the connection mechanism.

FIG. 6 is a sectional view showing the first piping connector 131 and the second piping connector 132 fixedly connected by the first arm 133a and the second arm 133b of the connection mechanism 130. From this figure, an aspect in which the tapered part of the flange portion 131b of the first piping connector 131 and the tapered part of the flange portion 132b of the second piping connector 132 are fastened and fixed by the inclined surfaces of the groove of the first arm 133a and second arm 133b which have a shape widened toward the inner circumference can be found.

Herein, O-rings are used to keep waterproof property of connection portions. Specifically, an O-ring 134a is used to ensure waterproof property between the first electronic device 110 and the first piping connector 131, and an O-ring 134b is used to ensure waterproof property between the second electronic device 120 and the second piping connector 132. Also, an O-ring 134c is used to ensure waterproof property between the first piping connector 131 and the second piping connector 132.

Also, wiring holes formed in the first piping connector 131 and second piping connector 132 are respectively set to correspond to a size of a wiring pipe of the first electronic device 110 and a size of a wiring pipe of the second electronic device 120. Herein, the wiring pipe of the first electronic device 110 is larger than the wiring pipe of the second electronic device 120, and an inner diameter of the second piping connector 132 is changed in the middle so that the wiring hole located toward the second electronic device 120 is smaller. In this case, a step portion in the wiring hole is machined to become an inclined surface, so that the wiring 140 can easily pass therethrough.

Meanwhile, although in the foregoing example, the piping clamp 133 is constituted of the first arm 133a and the second arm 133b configured to be openable and closable by attaching ends thereof to each other via the pin 133c, the piping clamp may have any other configurations.

Figure 7:
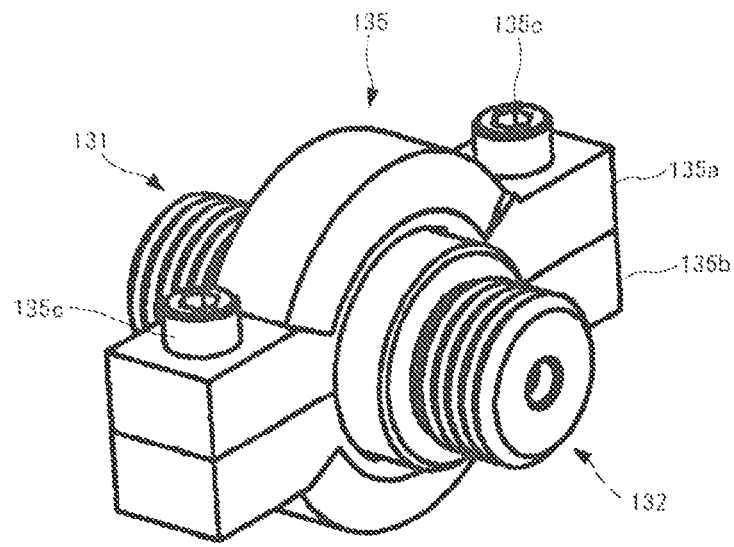
FIG. 7 is a view showing another example of the structure of the piping clamp.
Figure 8:
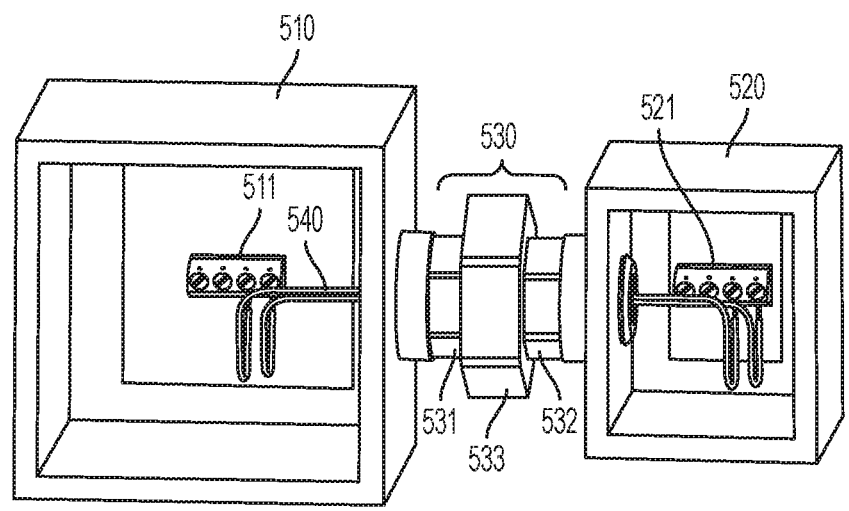
FIG. 8 is a view explaining a conventional example of a connection mechanism for fixedly connecting electronic devices to each other.
Figure 9A:
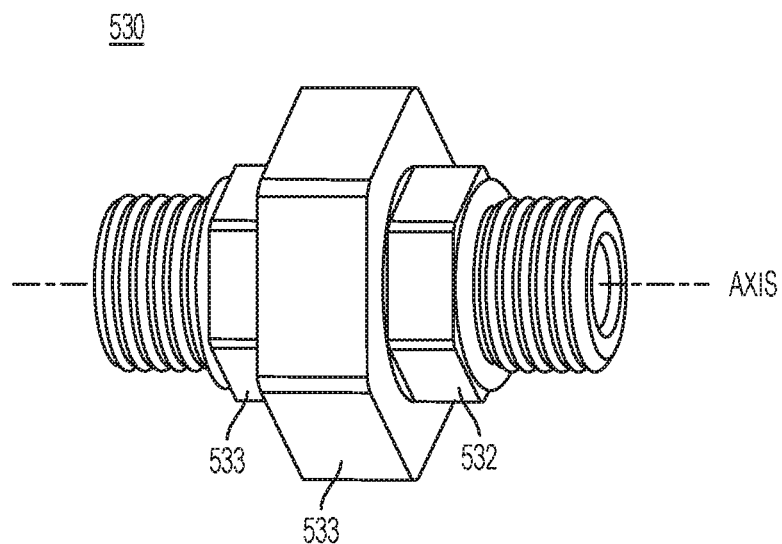
FIGS. 9A and 9B are views showing a structure of a conventional connection mechanism.
Figure 9B:
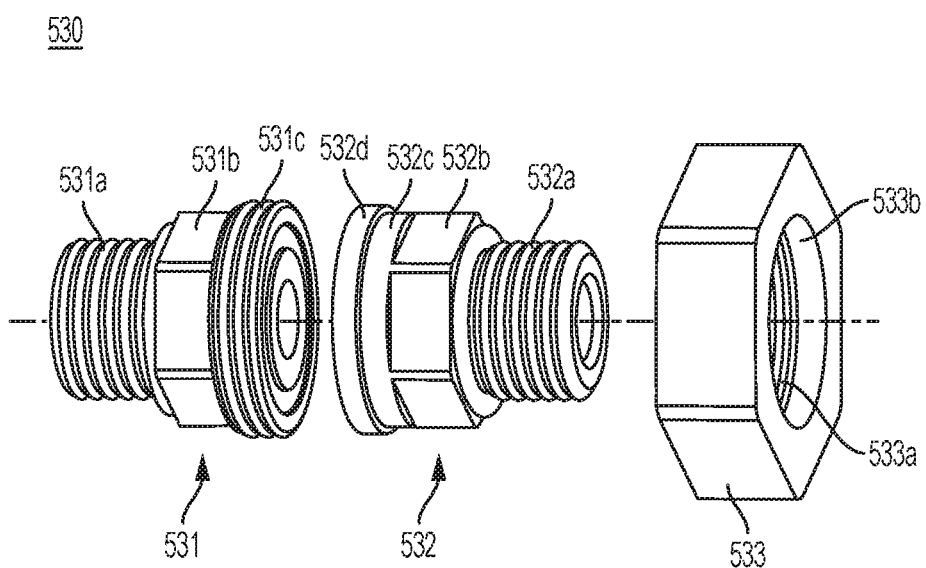
Figure 10:
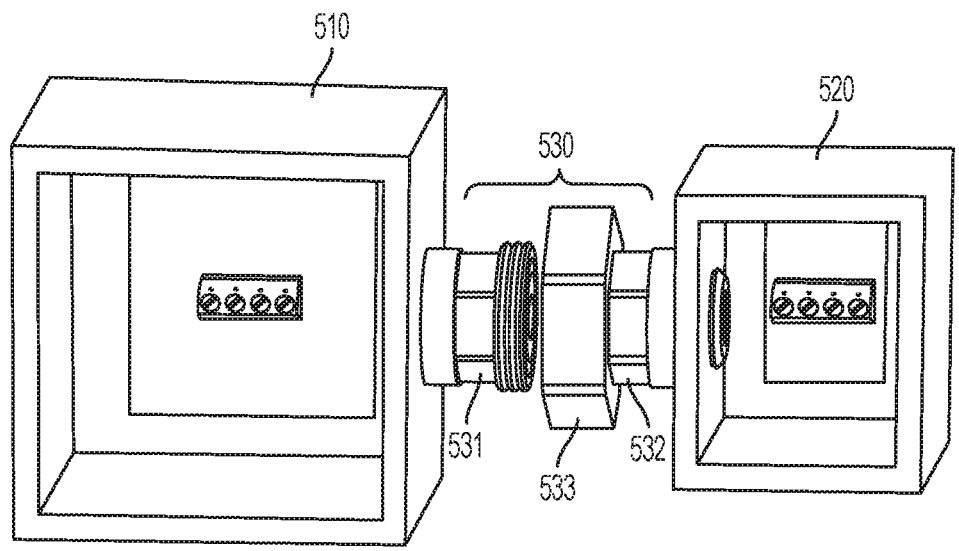
FIG. 10 is a view explaining procedures when the connection mechanism fixedly connects a first electronic device and a second electronic device to each other.
Figure 11:
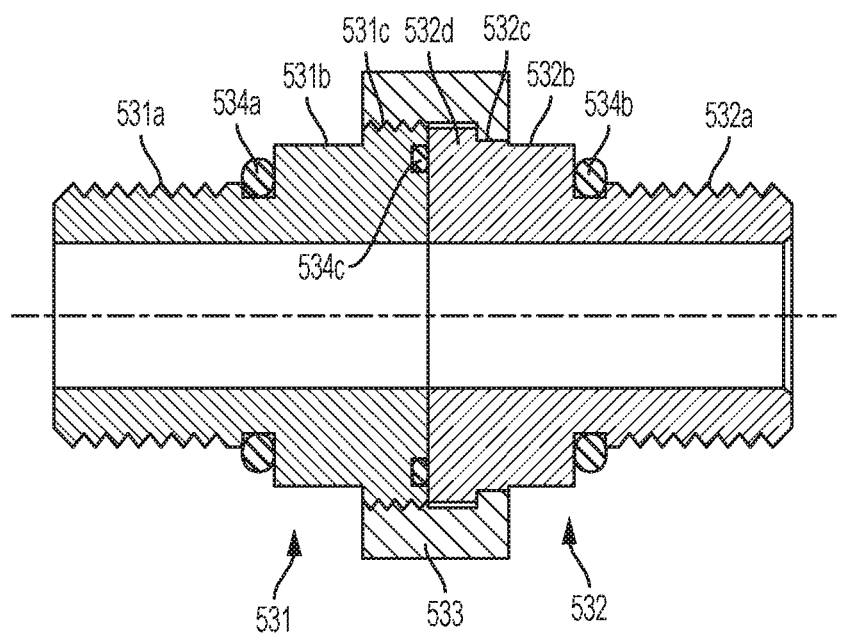
FIG. 11 is a sectional view showing a first piping connector and a second piping connector fixedly connected by the connection mechanism.

For example, as shown in FIG. 7, a piping clamp 135 may be configured so that both ends of a first arm 135a and a second arm 135b are fixed by screws 135c. In this case, likewise, a groove having inclined surfaces is formed in an inner circumference of the first arm 135a and second arm 135b, so that the groove in the inner circumference of the arms sandwiches the flange portion 131b of the first piping connector 131 and the flange portion 132b of the second piping connector 132. In this case, the screws 135c serve as a fastening and fixing mechanism for the arms.

Meanwhile, in the foregoing description, specific preferable embodiments are just described for the purpose of explaining and illustrating the present invention. Accordingly, the present invention is not limited to the foregoing embodiments, but is intended to encompass various changes and modifications thereof without departing from the spirit thereof.

In addition, this application is based on Japanese Patent Application No. 2013-221024 filed on Oct. 24, 2013, the entire contents of which are incorporated herein by reference. Also, all references cited herein are incorporated in their entireties.

REFERENCE NUMERALS LIST

110 . . . First electronic device
111 . . . Terminal block
120 . . . Second electronic device
121 . . . Terminal block
130 . . . Connection mechanism
131 . . . First piping connector
131a . . . Male threaded portion
131b . . . Flange portion
131c . . . Cut-out surface
131d . . . Guide portion
132 . . . Second piping connector
132a . . . Male threaded portion 132b . . . Flange portion
132c . . . Cut-out surface
132d . . . Guide hole portion
133 . . . Piping clamp
133a . . . First arm
133b . . . Second arm
133c . . . Pin
133d . . . Pin
133e . . . Bolt
133f . . . Butterfly nut
135 . . . Piping clamp
135a . . . First arm
135b . . . Second arm
140 . . . Wiring

The invention claimed is:

1. A connection mechanism which connects a first electronic device and a second electronic device to each other, comprising:
   a first cylindrical piping connector comprising a first flange portion and a guide portion having a shape protruding in an axial direction, the first piping connector configured to be connected to the first electronic device;
   a second cylindrical piping connector comprising a second flange portion having the same diameter as that of the first flange portion and a guide hole portion having a shape recessed in the axial direction to allow the guide portion to be fitted therein, the second piping connector configured to be connected to the second electronic device; and
   a piping clamp comprising two half circular arc-shaped arm portions and a fastening and fixing mechanism configured to fasten and fix the two arm portions to form a circle, the two arm portions each having a groove formed in an inner circumference thereof to allow the first flange portion and the second flange portion to be fitted therein in a state where the guide portion is fitted in the guide hole portion,
   wherein end surfaces of the first and second flange portions contact against each other in the state in which the guide portion is fitted into the guide hole portion, and
   wherein one of the first piping connector and the second piping connector has an inner diameter-changing part, and an inclined surface that changes an inner diameter is formed on the inner diameter-changing part, and
   wherein a position of the inner diameter-changing part is away from the guide portion and the guide hole in the axial direction.

2. The connection mechanism according to claim 1, wherein each of the first flange portion and the second flange portion has cut-out surfaces formed in parallel to each other at two symmetrical positions on an outer circumference thereof so as to be held when being fastened to each of the first and second electronic devices, wherein the cut-out surfaces of the first flange portion and the second flange portion have the same shape.

3. The connection mechanism according to claim 1, wherein a part of the first flange portion, which is located toward the first electronic device, and a part of the second flange portion, which is located toward the second electronic device, are tapered;
   wherein the grooves of the arm portions of the piping clamp have inclined surfaces formed to be widened toward the inner circumference.

4. The connection mechanism according to claim 1, wherein the two arm portions of the piping clamp are connected at ends thereof to each other via a pin to allow the arm portions to be opened and closed, and a hook and a butterfly nut are used as the fastening and fixing mechanism at the other ends of the two arm portions.

5. The connection mechanism according to claim 1, wherein an end of the guide portion is tapered.

6. The connection mechanism according to claim 1, wherein the first cylindrical piping connector further comprises a first threaded portion on an end opposite the guide portion, the first threaded portion configured to be fastened to the first electronic device, and
   wherein the second cylindrical piping connector further comprises a second threaded portion on an end opposite the guide hole portion, the second threaded portion configured to be fastened to the second electronic device.

7. The connection mechanism according to claim 1, wherein an inner diameter at a proximal end of the guide hole portion is greater than an inner diameter of a distal end of the guide hole portion.

8. The connection mechanism according to claim 1, wherein the second flange portion has a same shape and size as the first flange portion.

9. A connection mechanism comprising:
   a first piping connector comprising a first flange and a male portion, the first piping connector configured to be connected to a first electronic device;
   a second piping connector comprising a second flange having the same diameter as the first flange, and a female portion for receiving the male portion, the second piping connector configured to be connected to a second electronic device; and
   a piping clamp comprising two arm portions having a groove formed in an inner circumference thereof to receive the first and second flanges, and a fastening and fixing mechanism configured to fasten and fix the two arm portions together securing the first and second flanges to contact against each other in a state in which the male portion is received in the female portion,
   wherein an inner wall of one of the first piping connector and the second piping connector comprises an inclined surface that changes the inner wall from a first diameter to a second diameter, and
   wherein a position of the inner diameter-changing part is away from the guide portion and the guide hole in the axial direction.

10. A method for connecting a first electronic device and a second electronic device to each other, the method comprising:
   fastening a first cylindrical piping connector to the first electronic device, the first piping connector comprising a first threaded portion, a first flange portion and a guide portion having a shape protruding in an axial direction, and the first cylindrical piping connector being fastened to the first electronic device using the first threaded portion;
   fastening a second cylindrical piping connector to the second electronic device, the second cylindrical piping connector comprising a second threaded portion, a second flange portion having the same diameter as that of the first flange portion and a guide hole portion having a shape recessed in the axial direction to allow the guide portion to be fitted therein, and the second cylindrical piping connector being fastened to the second electronic device using the second threaded portion;

fitting the guide portion of the first piping connector into the guide hole portion of the second piping connector; and fastening and fixing two half circular-arc shaped arm portions of a piping clamp to form a circle, the two arm portions having a groove formed in an inner circumference thereof, after the first flange portion and the second flange portion are fitted in the groove in an overlapped state, wherein one of the first cylindrical piping connector and the cylindrical second piping connector has an inner diameter-changing part, and an inclined surface that changes an inner diameter is formed on the inner diameter-changing part, and wherein a position of the inner diameter-changing part is away from the guide portion and the guide hole in the axial direction.

* * * * *